US008566104B2

(12) United States Patent
Michelini et al.

(10) Patent No.: US 8,566,104 B2
(45) Date of Patent: *Oct. 22, 2013

(54) NUMERIC WEIGHTING OF ERROR RECOVERY PROMPTS FOR TRANSFER TO A HUMAN AGENT FROM AN AUTOMATED SPEECH RESPONSE SYSTEM

(75) Inventors: Vanessa V. Michelini, Boca Raton, FL (US); Melanie D. Polkosky, Collierville, TN (US)

(73) Assignee: Nuance Communications, Inc., Burlington, MA (US)

( * ) Notice: Subject to any disclaimer, the term of this patent is extended or adjusted under 35 U.S.C. 154(b) by 310 days.

This patent is subject to a terminal disclaimer.

(21) Appl. No.: 13/287,004

(22) Filed: Nov. 1, 2011

(65) Prior Publication Data

US 2012/0046951 A1    Feb. 23, 2012

Related U.S. Application Data

(63) Continuation of application No. 11/204,510, filed on Aug. 16, 2005, now Pat. No. 8,073,699.

(51) Int. Cl.
*G10L 21/00*    (2013.01)
*G10L 17/00*    (2013.01)
*G10L 15/00*    (2013.01)
*H04M 3/00*    (2006.01)

(52) U.S. Cl.
USPC .... 704/270.1; 704/246; 704/257; 379/265.02

(58) Field of Classification Search
USPC ...................................... 704/270, 270.1, 275
See application file for complete search history.

(56) References Cited

U.S. PATENT DOCUMENTS

| 5,164,981 | A | 11/1992 | Mitchell et al. |
| 5,638,425 | A | 6/1997 | Meador, III et al. |
| 5,712,957 | A | 1/1998 | Waibel et al. |
| 5,918,222 | A * | 6/1999 | Fukui et al. ........................ 1/1 |
| 5,995,826 | A | 11/1999 | Cox et al. |
| 6,104,786 | A | 8/2000 | Gibilisco et al. |
| 6,122,613 | A | 9/2000 | Baker |
| 6,138,095 | A | 10/2000 | Gupta et al. |
| 6,173,266 | B1 | 1/2001 | Marx et al. |
| 6,243,684 | B1 | 6/2001 | Stuart et al. |
| 6,418,409 | B1 | 7/2002 | Metzger |
| 6,714,631 | B1 | 3/2004 | Martin et al. |
| 6,772,160 | B2 | 8/2004 | Cho et al. |

(Continued)

OTHER PUBLICATIONS

U.S. Appl. No. 10/954,785, Bantz, et al.

*Primary Examiner* — Richemond Dorvil
*Assistant Examiner* — Olujimi Adesanya
(74) *Attorney, Agent, or Firm* — Wolf, Greenfield & Sacks, P.C.

(57) ABSTRACT

A method for a speech response system to automatically transfer users to human agents. The method can establish an interactive dialog session between a user and an automated speech response system. An error score can be established when the interactive dialog session is initiated. During the interactive dialog session, responses to dialog prompts can be received. Error weights can be assigned to receive responses determined to be non-valid responses. Different non-valid responses can be assigned different error weights. For each non-valid response, the assigned error weight can be added to the error score. When a value of the error score exceeds a previously established error threshold, a user can be automatically transferred from the automated speech response system to a human agent.

18 Claims, 5 Drawing Sheets

(56) References Cited

U.S. PATENT DOCUMENTS

| | | |
|---|---|---|
| 6,792,096 B2 | 9/2004 | Martin et al. |
| 6,978,238 B2 | 12/2005 | Wohlsen et al. |
| 7,023,979 B1 | 4/2006 | Wu et al. |
| 7,366,666 B2 | 4/2008 | Balchandran et al. |
| 7,724,889 B2 | 5/2010 | Bushey et al. |
| 2002/0135618 A1* | 9/2002 | Maes et al. .................... 345/767 |
| 2003/0004717 A1 | 1/2003 | Strom et al. |
| 2003/0125945 A1 | 7/2003 | Doyle |
| 2003/0130849 A1 | 7/2003 | Durston et al. |
| 2003/0200084 A1 | 10/2003 | Kim et al. |
| 2004/0230438 A1 | 11/2004 | Pasquale et al. |
| 2004/0260543 A1* | 12/2004 | Horowitz et al. ............. 704/221 |
| 2005/0081152 A1 | 4/2005 | Commaford et al. |
| 2005/0183032 A1 | 8/2005 | Bushey et al. |
| 2006/0115070 A1 | 6/2006 | Bushey et al. |
| 2006/0215824 A1 | 9/2006 | Mitby et al. |
| 2007/0005369 A1* | 1/2007 | Potter .......................... 704/275 |

* cited by examiner

```
Main Prompt 1: Who would you like to contact?                                    510
        Error prompts:
Misreco 1.1: I didn't understand. Who would you like to contact?
Misreco 1.2: I didn't understand. Please say the full name of the person you want to contact.
Timeout 1.1: I didn't hear you. Please speak up.
Timeout 1.2: I didn't hear you. Please say the full name of the person you want to contact.
Help 1: At any time you can say Help, Operator, or Good bye. Who would you like to
contact.?

Main Prompt 2: [person's name]. Would you like me to dial it now?
        Error prompts:
        Misreco 2.1: I didn't understand. To transfer the call to [person's name], say yes.
        Timeout 2.1: I didn't hear you. To transfer the call to [person's name], say yes.
        Help 2: At any time you can say Help, Operator, or Good bye. Would you like to be
        transfer to [person's name] now?
```

```
[S] Who would you like to contact?
[C] I would like to talk to John Smith in sales.                                 520
[S] I didn't understand. Who would you like to contact? (Misreco 1.1)
[C] <silence>
[S] I didn't hear you. Please speak up. (Timeout 1.1)
[C] I WOULD LIKE TO TALK TO JOHN SMITH (speaking louder)
[S] I didn't understand. Please say the full name of the person you want to contact. (Misreco
1.2)
[C] John Smith
[S] John Smart. Would you like me to dial it now?
[C] hummm.... (Misreco 2.1)
[S] I didn't understand. To transfer the call to John Smart, say yes.
[C] I want to talk to John SMITH not SMART (Misreco - threshold reached)
[S] I notice that I'm not understanding you very well... to further assist you, please hold
while I get a customer service representative
```

```
[S] Who would you like to contact?
[C] I would like to talk to John Smith in sales.                                 530
[S] I didn't understand. Who would you like to contact? (Misreco 1.1)
[C] <silence>
[S] I didn't hear you. Please speak up. (Timeout 1.1)
[C] I WOULD LIKE TO TALK TO JOHN SMITH (speaking louder...Misreco 1.2 - threshold
reached)
[S] I notice that I'm not understanding you very well... to further assist you, please hold
while I get a customer service representative
```

```
[S] Who would you like to contact?
[C] I would like to talk to John Smith in sales.                                 540
[S] Please say the full name of the person you want to contact. (syntactic error)
[C] <silence>
[S] This directory provides contact information for BMI employees and departments. Please
say the full name of the person you want to contact. (conceptual error)
[C] hummmm....erg, I ... (conceptual error - threshold reached)
[S] I notice that I'm not understanding you very well... to further assist you, please hold
while I get a customer service representative
```

Misreco 1.1 -> 2 points    550
Misreco 1.2 -> 4 points
Timeout 1.1 -> 3 points
Timeout 1.2 -> 6 points
Help 1: 8 points Misreco 2.1 -> 3 points
Timeout 2.1 -> 3 points
Help 2: 5 points

| Error Category | Severity | Error Weight | 560 |
|---|---|---|---|
| Acoustic error | High | 6 | |
| Acoustic error | Medium | 3 | |
| Acoustic error | Low | 1.5 | |
| Lexical error | High | 3 | |
| Lexical error | Medium | 2 | |
| Lexical error | Low | 1 | |
| Syntactic error | High | 4 | |
| Syntactic error | Medium | 2 | |
| Syntactic error | Low | 1 | |
| Conceptual error | High | 6 | |
| Conceptual error | Medium | 5 | |
| Conceptual error | Low | 2 | |

FIG. 5

NUMERIC WEIGHTING OF ERROR RECOVERY PROMPTS FOR TRANSFER TO A HUMAN AGENT FROM AN AUTOMATED SPEECH RESPONSE SYSTEM

RELATED APPLICATIONS

This Application is a continuation of U.S. patent application Ser. No. 11/204,510, entitled, "NUMERIC WEIGHTING OF ERROR RECOVERY PROMPTS FOR TRANSFER TO A HUMAN AGENT FROM AN AUTOMATED SPEECH RESPONSE SYSTEM," filed on Aug. 16, 2005, which is herein incorporated by reference in its entirety.

BACKGROUND

1. Field of the Invention

The present invention relates to the field of speech processing and, more particularly, to error recovery prompts for transfer to a human agent from an automated response system.

2. Description of the Related Art

Automated speech response systems are often used to interact with users through a speech modality with various degrees of success, often based upon user characteristics and the simplicity of a desired interaction. Many automated speech response systems provide an option for a user to interface with a human agent or human operator, to which the user can be transferred. The transfer can be automatic in response to the receipt of non-valid responses. For example, if a user fails to enter a correct response to a prompt three times in a row, the user can be automatically transferred.

Conventional techniques for determining when a user is to be automatically transferred to an operator are often based upon a single prompt-response condition. That is, response errors during an interactive session that occurred for a previous dialogue prompt are not considered in the processing of a current prompt-response. Consequently, a user that struggles with an automated interface, who eventually correctly responds to the prompts will not be transferred to an operator, even though the user will likely become frustrated with the automated interface. This frustration can result in user dissatisfaction, which may cause the user to avoid the automated response system in the future.

Additionally, conventional techniques treat all response errors as equal. This ignores the fact that different types of response errors can indicate different problems, some of which would indicate that a user should be transferred from the automated system to the human agent more rapidly than other types of problems.

For instance, a time-out error often results from a user pausing to either recall or to locate information needed to respond to a prompt. An erroneous Dual Tone Multi-Frequency (DTMF) selection or telephone keypad selection often indicates that a user either was impatient and pressed DTMF keys before hearing all available options, or simply inadvertently and erroneously pressed a response key. A speech misrecognition error, on the other hand, can indicate that an automated system has difficulty interpreting a speech response from a user. Conventional solutions teach all of these different error responses as equal for purposes of determining when to transfer a user to a human agent.

SUMMARY OF THE INVENTION

The present invention provides a method for automatically transferring a user from an automated speech response system to a human agent that takes response error type and/or error severity into account. More specifically, error responses can be categorized according to various established error categories. Additionally, an error severity can be determined for each erroneous response. The error category and/or error severity can be utilized to generate a numeric weight that is associated with an error response. Different error responses can be assigned different weights. The weights can be used to adjust a session error score variable and/or a prompt-response error variable. Each variable can be compared against a previous established threshold for the session and/or prompt. When the threshold is exceeded by a corresponding variable, a user can be automatically transferred from the automated speech response system to a human agent.

The present invention can be implemented in accordance with numerous aspects consistent with material presented herein. For example, one aspect of the present invention can include a method for a speech response system to automatically transfer users to human agents. The method can establish an interactive dialog session between a user and an automated speech response system. An error score can be established when the interactive dialog session is initiated. During the interactive dialog session, responses to dialog prompts can be received. Error weights can be assigned to receive responses determined to be non-valid responses. Different non-valid responses can be assigned different error weights. For each non-valid response, the assigned error weight can be added to the error score. When a value of the error score exceeds a previously established error threshold, a user can be automatically transferred from the automated speech response system to a human agent.

Another aspect of the present invention can include a method that includes the steps of establishing a dialog session and initializing an error score for the dialog session. During the dialog session one or more prompts can be presented to a user. For each prompt, a prompt response can be received and processed. When the prompt response is not a valid response, the method can assign an error weight to the prompt response. The error weight can be added to the error score. The error score can be compared to an error threshold. The user can be automatically transferred to a human agent when the error score exceeds the error threshold.

Still another aspect of the present invention can include a speech response system comprising a dialog processor and an error processor. The dialog processor can direct interactions between users and the speech response system in accordance with configurable dialogue prompts and in accordance with response actions. Response actions can be associated with different user responses to the dialog prompts. The error processor can assign numeric weights to prompt responses that are not recognized by the speech response system as valid responses. Different numeric values can be assigned to different prompt responses based upon a category of error and/or a severity level of an error.

The speech response system can establish an error score for each interactive dialog session between a user and the speech response system. During each interactive dialog session when invalid responses are detected, a numeric weight can be assigned to the invalid response by the error processor. The assigned numeric weight can be added to the error score. The speech response system can automatically transfer a user to a human agent when during an interactive dialog session the error score associated with the interactive dialog session exceeds an established error threshold.

Yet another aspect of the present invention can include a method for configuring a speech response system. The method can include identifying a service agent to configure a speech response system for a customer responsive to a service request. The service agent can configure an error threshold for the speech response system as well as configure several error weights. Each of the error weights can be associated with an error response or a type of error response. Different values can be established for different ones of the error weights. After being configured, the speech response system can automatically transfer a user to a human agent when an error score for an interactive session exceeds the error threshold of the speech response system. Each time during the interactive session that an error response is detected, the detected response can be assigned one of the error weights. The assigned error weight can be added to the error score. The increased error score can be compared against the error threshold to determine if it is appropriate to transfer the user to a human agent.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 5 provides an illustrative example of a dialog interaction in accordance with an embodiment of the inventive arrangements disclosed herein.

DETAILED DESCRIPTION OF THE INVENTION

Figure 1:
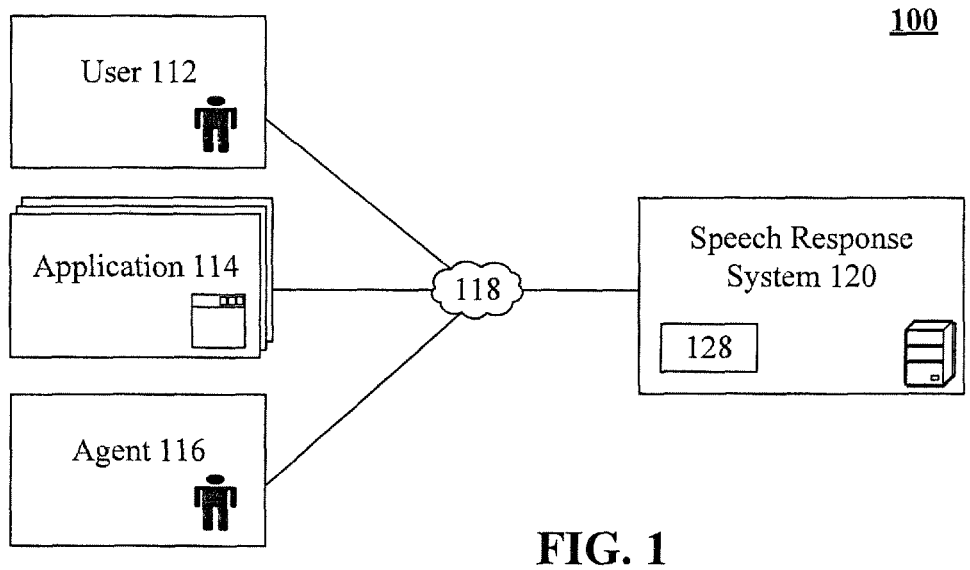
FIG. 1 is a schematic diagram illustrating a system that numerically weights error recovery prompts to determine if a user should be transferred to a human agent from an automated speech response system in accordance with an embodiment of the inventive arrangements disclosed herein.

FIG. 1 is a schematic diagram illustrating a system 100 that numerically weights error recovery prompts to determine if a user should be transferred to a human agent from an automated speech response system 120 in accordance with an embodiment of the inventive arrangements disclosed herein. Speech response system 120 can include an error processor 128 that assigns different weights to different invalid user responses. An error score based upon these error weights can be compared against an error threshold. When the error threshold is exceeded, user 112 can be automatically transferred to human agent 116.

Speech response system 120 can be any computing system with speech processing capabilities that enable user 112 to interface with the speech response system 120 using a speech modality. Speech response system 120 can accept speech input (in addition to other input) and can produce speech output (in addition to other output). Speech response system 120 may be utilized as a user interface for a plurality of remotely located applications 114.

In one embodiment, speech response system 120 can be an interactive voice response (IVR) system that user 112 can access through a telephone. Many businesses utilize such an IVR for automated bill pay, account status, service outage reporting, and as an initial call routing service designed to determine a user's area of concern and to route the caller to an appropriate department. In another embodiment, speech response system 120 can be a Web server providing Web-based interactive communications with a user via a Web Browser interface. In still another embodiment, the speech response system 120 can be an application local to a machine on which user 112 interacts, which is capable of automatically determining when user 112 is to be automatically transferred to a human agent. For example, the speech response system 120 can provide automated help to a computer user. The speech response system 120 can transfer the user to a human agent for interactive help, when the speech response system 120 determines from error responses that human agent assistance is appropriate.

The speech response system 120 can be communicatively linked to user 112, application 114, and human agent 116 via network 118.

Network 118 can include any communication link and associated equipment capable of conveying signals containing information across an intervening space. Network 118 can include a telephony network capable of conveying audio between communicatively linked entities. Network 118 can also include a data network for conveying data that has been digitally encoded in a series of packets. Network 118 can include a personal area network, a local area network, and a wide area network. Network 118 can include land based communication lines as well as wireless communication pathways.

In operation, a communication link over a network 118 can be established between user 112 and the speech response system 120. For example, when the speech response system 120 is accessible via a telephony interface, a user 112 can call the speech response system using a telephone. The speech response system 120 can follow a previously established dialog menu stored within a data store and managed by a dialog menu processor. Following the dialog, the speech response system 120 can present a series of prompts to user 112, each prompt requiring a user response. The user responses can result in the speech response system 120 performing one or more programmatic actions, which can be performed with the assistance of application 114.

For example, a user response can indicate that user 112 wants to be presented with a current account balance for a banking account. The bank account information can be stored within a banking application 114. When speech response system 120 receives the user response, it can automatically format an inquiry in a format required by the banking application 114, can query banking application 114, and can receive a query response, which the speech response system can format for presentation to user 112. The prompts presented to user 112 can be audibly presented prompts that include automatically generated speech, which has been generated using a speech-to-text engine. User responses can include speech utterances, which are speech-to-text converted using a text-to-speech engine.

From time to time, a user response can be incomprehensible to speech response system 120. That is, the speech response system 120 is unable to interpret a user response in accordance with valid dialog menu options. Such user responses are considered error responses that can be handled by error processor 128. Each error response is assigned an error weight by error processor 128, where assigned error weights can vary from error response to error response. Error weights can be added to a cumulative error score. When the cumulative error score exceeds a previously determined threshold, user 112 can be optionally presented with a prompt indicating that the user is to be transferred to a human operator. Speech response system 120 can then automatically transfer user 112 to human agent 116 so that the human agent 116 and the user 112 can interact through a communication link.

The communication link between user 112 and human agent 116 can take any of a variety of forms so long as it enables the user to exchange information with a human agent, typically in real-time or in near real time. For example, the communication link can include a telephony link enabling the user 112 and the human agent 116 to converse in real time. In another example, the communication link can include a video conferencing link. The communication link can also include an Internet chat session between the user 112 and the human agent 116, can include an interactive Web browsing session, and the like.

Figure 2:
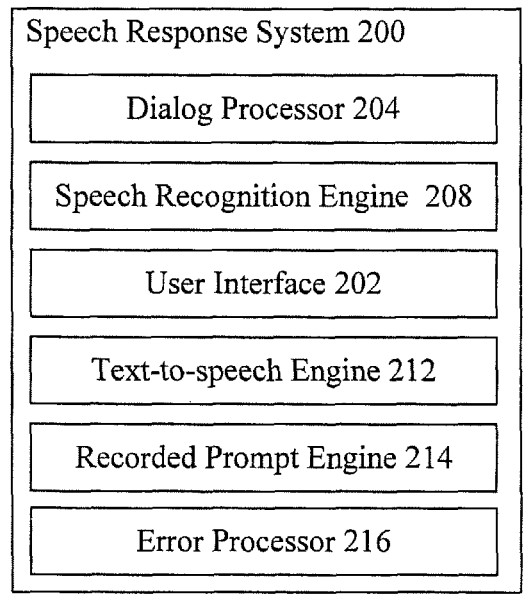
FIG. 2 is a schematic diagram of a speech response system including an error processor in accordance with an embodiment of the illustrative arrangements disclosed herein.

FIG. 2 is a schematic diagram of a speech response system 200 including an error processor in accordance with an embodiment of the illustrative arrangements disclosed herein. System 200 represents one contemplated embodiment for the speech response system 120. It should be understood that other embodiments for speech response system 120 exist and that the invention is not to be construed as limited in this regard. That is, system 200 represents one embodiment illustrating a contemplated internal structure for speech response system 120. The internal structure of speech response system 120 can be implemented using any techniques known in the art, so long as the speech response system includes an error processing module that uses weighted error responses to determine when a user is to be automatically transferred to a human agent.

System 200 can include a computing device that performs speech processing functions. The computing device can be any device for processing instructions and data in the form of electrical signals, and having a speech-recognition capability such that the instructions and data can be supplied by voice input. Accordingly, the computing device can be, for example, a general-purpose computer such as a main-frame or personal computer (PC) that includes dedicated circuitry and/or software for implementing speech recognition. Alternately, the computing device can be a special-purpose computer such as a voice server. Still other examples of the computing device include a mobile phone, a personal digital assistant (PDA), and any of a host of embedded devices familiar to those of ordinary skill in the art.

System 200 can include a speech-based interface 202, a dialog processor 204, a speech recognition engine 208, a text-to-speech engine 212, and/or a recorded prompt engine 214, each of which can be implemented by software and/or firmware configured to be executed by components of system 200. The speech-based user interface 202 can be a user interface with a speech modality, which can include an audio user interface, a graphical user interface, or both.

The dialog processor 204 can be configured for conducting dialogs in accordance with previously established dialog rules and menus. The dialogs conducted by the dialog processor 204 serve as a mechanism by which a user enters instructions and/or data into system 200 and by which the system 200 can interpret dialog responses. For each task to be performed by the system 200, there can be a corresponding dialog that comprises the particular speech-based instructions and/or information that is entered by the user via the speech-based user interface 202 to affect the specific task. The particular dialog is conducted or controlled by the dialog processor 204. Each of the prompts managed by the dialog processor 204 can include a directed prompt in the sense that each sequence of one or more prompts corresponds to the particular dialog for completing the specific task. The dialog can vary widely and can be designed to perform any number of tasks. For example, the dialog may be designed to allow the user to conduct an automated financial transaction, make an airline reservation, control a machine or plant, or accomplish various other tasks based upon verbal instructions and data entered via other input mechanisms using user interface 202.

At least a portion of the dialog responses can include speech responses that are processed by the speech recognition engine 208. Speech recognition engine 208 can utilize any of a variety of techniques known in the art to transform the received speech responses into a form that the system 200 can interpret. For example, the speech recognition engine 208 can include algorithmic modules based on one or more models such as an acoustic model, a lexical model, and a language model. The speech recognition engine 208 can generate a spectral representation derived from the digitized, time-varying signal by sampling the signal. Through a process of feature detection, segmentation, identification, and matching, the speech recognition module 208 causes the system 200 to generate computer-readable instructions and data elements from the spectral representation of the user-supplied speech input.

Text-to-speech engine 212 can convert text generated by the system 200, such as dialog prompts, into speech output. The speech output can be audibly presented to a user. As with the speech recognition engine 208, the text-to-speech engine 212 can be implemented using any of a variety of techniques known in the art including, but not limited to, concatentative text-to-speech synthesis techniques, format synthesis techniques, auticulatory synthesis techniques, hybrid synthesis techniques, and hidden Markov model (HMM) based synthesis techniques.

The recorded prompt engine 214 can be linked to a data store containing several previously recorded prompts and other previously recorded audio files. These previously recorded prompts can be selected based upon a current dialog state. For example, a particular previously recorded prompt can be played responsive to a user selecting an option on a telephone touchtone pad or speaking an option number.

In one embodiment, speech response system 200, can selectively utilize both recorded prompt engine 214 and text-to-speech engine 212, where text-to-speech engine 212 can be used to audible present portions of information that do not correspond to previously recorded prompts.

For example, speech response system 200 can generate an audio prompt of "You have entered account number XYZ is this correct? Press or say one for yes and two for no." Here the portion of the audio prompt for "You have entered account number" and "is this correct? Press or say one for yes and two for no" can be generated using recorded prompt engine 214. The portion of the audio prompt for "XYZ" can be generated using text-to-speech engine 212.

Error processor 216 can be used to handle converted user input that does not match an expected prompt response. Error processor 216 can determine a severity and/or category of each error response and can cause the user to be re-prompted for information. The new prompt can be phrased in a different manner or can provide some additional information to prevent a previous error from re-occurring. For example, a new prompt can state "Your spoken response was too soft to be understood, could you please repeat your response in a louder voice?" Each error response can be associated with a numeric weight that is added to a total error score. When the error score exceeds a designated threshold, a communication link can be established between the user and a human agent.

Figure 3:
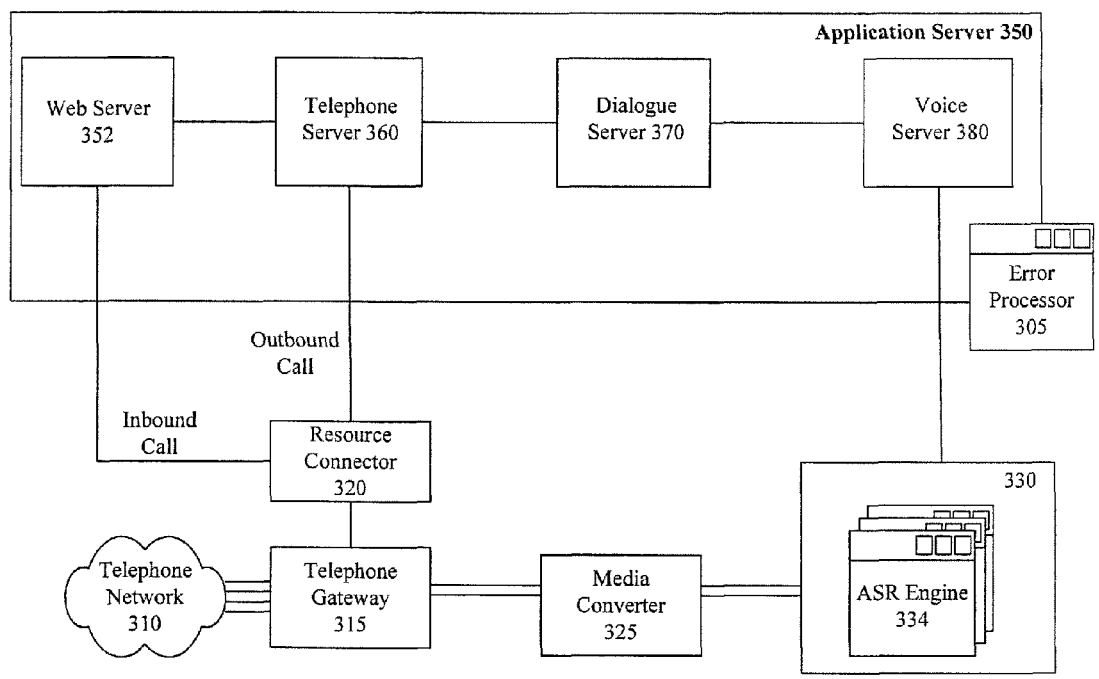
FIG. 3 is a schematic diagram of a system that includes a speech response system that can be accessed over a telephone network in accordance with an embodiment of the illustrative arrangements disclosed herein.

FIG. 3 is a schematic diagram of a system 300 that includes a speech response system that can be accessed over a telephone network in accordance with an embodiment of the illustrative arrangements disclosed herein. System 300 represents one contemplated embodiment for an environment in which the speech response system 120 and/or 200 operates.

System 300 represents an embodiment where multiple components that form a speech response system are provided by a number of software components installed within hardware devices, which can be remotely located from one another. That is, the functionality specified for speech response system 120 and 200 can be provided by a number of different cooperating components and computing systems. For example, in system 300, a user interface for the speech response system is provided by a cooperating combination of items 310, 315, 320, 325, and 350. To emphasize this point through other examples, in system 300, application server 350 performs the majority of functions described for systems 120 and 200; error processor 305 is functionally implemented within a combination of items 330, 370, and 380; speech processing engines (TTS engine and ASR engine 334) can be remotely located from a voice server 380 that requests speech processing services; and a dialog processor (not shown) for the speech response system can be integrated within dialogue server 370. It should be understood that other embodiments and environments for speech response system exist and that the invention is not to be construed as limited in this regard.

In FIG. 3, system 300 illustrates a turn-based operational environment in which voice processing tasks occur. More specifically, system 300 shows an architecture for a speech response system capable of interfacing with users connected via a telephone network 310. For example, the voice-enabled application server 350 can be a server for an automated call center application that interfaces with users via voice-based telephone sessions. The voice-enabled application server 350 can include an error processor 305, such as error processor 128 and/or error processor 216.

The system 300 can include a telephone gateway 315, one or more speech engines 330, a resource connector 320, and/or a media converter 325 in addition to application server 350. The telephone gateway 315 can include hardware and/or software that translates protocols and/or routes calls between a telephone network 310, such as a Public Switched Telephone Network (PSTN), and the application server 350. The resource connector 320 can connect inbound and outbound calls to the application server 350.

The speech engines 330 can include one or more automatic speech recognition engines 334, one or more text-to-speech engines (not shown), one or more recorded prompt engines (not shown), and other media resources. Particular ones of the speech engines 330 can include one or more application program interfaces (APIs) for interfacing with the application server 350.

The media converter 325 can route input/output streams in one format to appropriate speech engines 330 as assigned by the application server 350. Accordingly, the media converter 325 can assure that output generated by the application server 350 is converted into an outgoing audio stream with speech generated content and that speech input from an incoming audio stream is converted by an assigned speech engine 330 before being conveyed to the application server 350.

The application server 350 can also include a multitude of component servers, such as telephone server 360, dialogue server 370, and voice server 380, communicatively linked via one or more Web servers 352. Each Web server 352 can include one or more plug-ins, where each plug-in can include routines for conveying data to particular component servers within the application server 350. Each of the component servers of the application server 350 can be components implemented within a Virtual Machine, such as virtual machines adhering to the J2EE specification or other similar and/or derivative specification. In one embodiment, the application server 350 can include a Websphere (R) Application Server (WAS).

Figure 4:
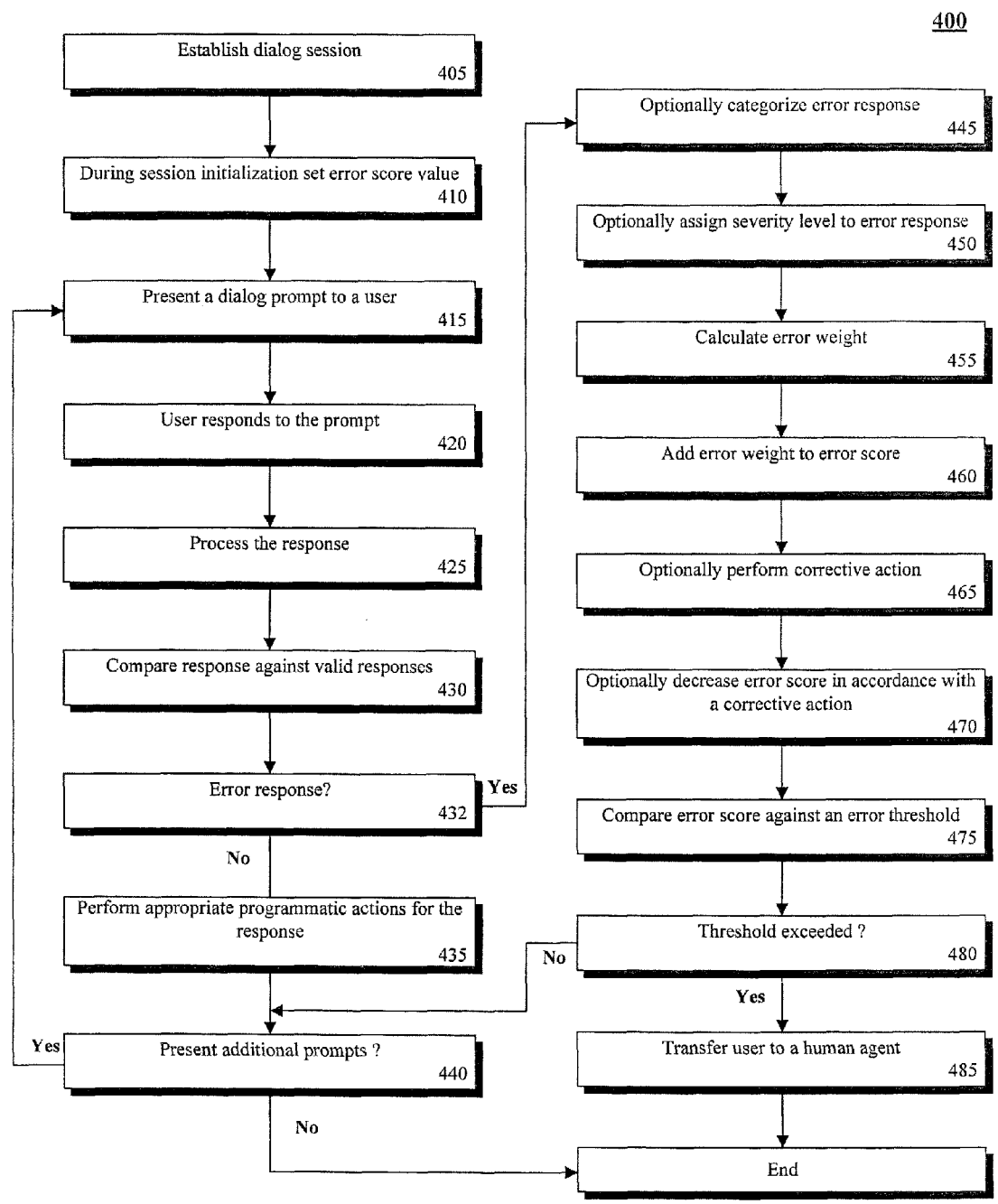
FIG. 4 is a flow chart illustrating a method for transferring callers from an automated speech response system to a human operator based upon weighted error responses in accordance with an embodiment of the inventive arrangements disclosed herein.

FIG. 4 is a flow chart illustrating a method 400 for transferring callers from an automated speech response system to a human operator based upon weighted error responses in accordance with an embodiment of the inventive arrangements disclosed herein. Method 400 can be performed in the context of any speech response system, such as system 100.

Method 400 can begin in step 405, where an interactive dialog session can be established between a user and an automated speech response system. The interactive session with automated system can take many forms including, but not limited to, a telephony session, an assisted Web browsing session, a chat session, an instant messaging session, a software assisted user help session, and the like. Regardless of its form, the automated speech response system can present a series of prompts to a user and the user can speak responses to the prompts. In step 410, during session initialization, a session error score can be established.

In step 415, the interactive speech response system can present a prompt. In step 420, the user can provide a response to the prompt. For purposes here, the spoken response can include a lack of response or a time-out response. The response can include a speech response as well as user input from a peripheral device. For example, user input can include dual tone multi-frequency (DTMF) responses from a telephone keypad. Responses can also include keyboard input, an input from a user selection of a GUI interface. Whether or not the interactive speech response system can accept keypad, keyboard, mouse, touch screen, or other input, the interactive speech response system is configured to accept speech input responsive to at least a portion of the presented prompts.

In step 425, the interactive speech response system can process the response, converting it from the user provided format to a format internally understood. For example, the speech response system speech-to-text convert a spoken response and can convert a DTMF response into a numeric selection. In step 430, the converted response can be compared against valid responses. Valid responses can vary depending on the prompt type to which the user responds.

In step 430, the system can detect whether the response is an error response. In step 435, if the response is a valid response (not an error response), the system can perform appropriate programmatic actions. In step 440, a determination can be made as to whether additional user prompts are to be presented. If so, the system can loop back to step 415. If not, the method can end.

If the response is an error response, the system can proceed from step 430 to step 445. In optional step 445, the error response can be categorized into an error category. Error categories can include system established default categories, administrator established categories, and/or user established or adjusted categories. In one embodiment, two categories can be established consisting of a misrecognition category and a time-out category. In another embodiment, established categories for error can include categories for acoustic errors, lexical errors, syntactical errors, and conceptual errors. Each of the different error categories can be associated with an error weight.

In optional step 450, the error response can be assigned a severity level. A severity level can be determined in many different fashions, each designed to indicate a level of difficulty that a user is experiencing in interacting with the speech response system. For example, a repeated error may be assigned a different severity level than an initial error, since a repeated mistake can indicate more severe user confusion than an initial mistake. Severity may apply to a single prompt, or to an entire dialog interaction. For example, if a user has made three response errors categorized as acoustic errors, then the severity of later acoustic errors can be increased.

In step 455, the error category and/or the severity can be used to calculate an error weight. In step 460, the error weight can be added to the error score. In optional step 465, a corrective action can be taken by the system to address the response errors. When a corrective action is believed to be successful, the error score can be decreased. For example, if multiple acoustic errors are received, each being a result of input received by the speech response system being too loud, the speech response system can reduce the volume of the received signal or perform some other digital signal processing designed to alleviate the acoustic errors.

In another example; if multiple syntactic errors are received, the speech-to-text engine can be adjusted to compensate. For instance, syntax for native English speakers can be different than syntax of speakers having English as a second language. Different speech-to-text processing rules can apply to different first languages, such as Spanish, Arabic, Urdu, and Chinese, each resulting in different syntactical variations. Successful adjustments for syntax can result in the error score being decreased.

In optional step 470, the error score can be decreased based on dialog time because a number of response errors "normal" for a long dialog is less than the number of response errors "normal" for a short dialog. In step 475, the error score can be compared against an error threshold. If the error threshold is not exceeded, the method can proceed from step 475 to step 415. In step 485, when the error threshold is exceeded by the error score, the user can be transferred from the speech response system to a human agent after being optionally notified of the transfer.

FIG. 5 provides an illustrative example of a dialog interaction in accordance with an embodiment of the inventive arrangements disclosed herein. More specifically, FIG. 5 includes dialog menu 510, dialog interactions 520, 530, and 540, and error weight tables 550 and 560. The dialog interactions depicted in FIG. 5 can be conducted in the context of any of systems 100, 200, or 300 and/or in the context of method 400.

Dialog menu 510 can be used in a situation where different dialog prompts are presented to a user depending upon the type of error response received. Dialog menu 510 depicts a dialog structure where two categories of error responses are detected, misrecognition errors and timeout errors. It should be appreciated that any number of error categories can be established and that different dialog prompts can be specified for different categories.

As illustrated, dialog menu 510 can include a main prompt 1 that queries a user for a desired contact. Misrecognition prompt 1.1 and misrecognition prompt 1.2 can each provide a statement to the effect that a response was not understood and that the response should be repeated. Timeout prompt 1.1 and timeout prompt 1.2 can each indicate that no response was received and that a responding user needs to speak up. A help 1 prompt can also exist that allows a user to explicitly select an automated help dialog or that allows the user to explicitly request operator assistance.

When a contact name is understood by a speech response system, the system can progress from main prompt 1 to main prompt 2. Main prompt 2 can ask if the use wants to be connected to the provided contact. Error prompts for misrecognition (misrecognition prompt 2.1) and for timeout (timeout prompt 2.1) can be associated with main prompt 2 as well as help prompt 2.

Dialog interaction 520 provides an interaction between a system [S] and a user or caller [C] which utilizes dialog menu 510. From dialog interaction 520, it can be understood that prompt is first presented by the system [S] to which caller [C] responds. When a caller's response is not understood, suitable error prompts for the type of error response are provided. If a particular error type is repeated, the error prompt can progress from an X.1 version of a prompt to a X.1 version of the prompt. Accordingly, for a first misrecognition response, misrecognition prompt 1.1 can be presented and for a second misrecognition response, misrecognition prompt 1.2 can be presented.

Error weight table 550 illustrates that different error weights can be associated with an error prompt. For example, misrecognition prompt 1.1 can be assigned a numeric weight of two and misrecognition prompt 1.2 can be assigned a numeric weight of four. Help requests, such as a request associated with help prompt 1 and help prompt 2 can also be assigned a numeric error weight, such as eight and five respectively. A maximum error threshold can be established at a value, such as seven. At the beginning of the dialog interaction, such as during an initialization stage of system [S], an error score can be established at an initialization value, such as zero.

Using the error weight table 550 in conjunction with dialog interaction 520 the following error calculations can be made. At the time main prompt 1 is presented, the error score equals zero, which is less than the maximum error threshold of seven, so control for the interaction is maintained by the system [S]. When misrecognition prompt 1.1 is presented, the error score can equal two (zero plus the numeric value associated with misrecognition prompt 1.1). When timeout prompt 1.1 is presented, the error score can equal five (two plus three or two plus the numeric value associated with timeout prompt 1.1). When the misrecognition prompt 1.2 is presented, the error score can equal nine (five plus four or five, which is the numeric value associated with misrecognition prompt 1.2). Because the error score (nine) now exceeds the error threshold (seven), the caller [C] can be automatically transferred to a human agent. A prompt can be played to notify the caller of the transfer, such as "I notice that I am not understanding you very well . . . to better assist you, please hold while I get a customer service representative".

Error weight table 560 illustrates how different numeric values can be assigned to different categories of error. From error weights 560, different categories of error can include acoustic errors (assigned a numeric weight value of three), lexical errors (assigned a numeric weight value of two), syntactic errors (assigned a numeric weight value of two), and conceptual errors (assigned a numeric weight value of five).

An acoustic error can be determined by monitoring the audio level of input and/or signal-to-noise ratio of the speech input. Error prompts associated with acoustic errors relating to the level of input can include "please speak louder/softer". Prompts relating to poor signal-to-noise ratio can include "please use a handset instead of a speaker phone option" or "please reduce background noise; I am unable to understand you because of it."

A lexical error can be determined by monitoring for non-single word responses. Prompts relating to lexical errors can present a list of valid responses for the user to select or can provide an example of a valid response and/or response format for the user to emulate. For example, "I did not understand your response. Please speak your first name followed by your last name, such as "John Smith".

A syntactic error can be determined by evaluating the part of speech of the user's response (e.g. noun, verb) and its match to an expected part of speech for a prompt response. The prompt associated with a syntactic error can provide a rephrased version of an originally presented prompt using different syntax. For example, a prompt can be posed as a declarative sentence instead of as a question.

A conceptual error can be determined by either no user response within a designated time or by an out of context user response. Depending on the type of conceptual error, a speech response system can provide a clarification of the purpose of the interface and basic instruction for interfacing with the system via speech. For example, "Please speak a response to the last question within ten seconds of hearing the question." or "The system expects you to respond by speaking a number between one and five corresponding to the desired option, please reply again."

In addition to the numeric error value associated with a category, each error category can also include a multiplier based on the severity of the detected error. As shown, the different severities are high, normal, and low, each associated with a different multiplier. For example, acoustic errors can have multipliers of two times for high, one times for normal and point five times for low. An acoustic error having a high severity can be assigned a numeric weight of six (three for the acoustic error type times two for high severity equals six), an acoustic error having a normal severity can be assigned a numeric weight of three, and an acoustic error having a low severity can be assigned a numeric weight of one point five.

Dialog interaction 530 illustrates an interaction where multiple error categories are determined and used to generate category specific error prompts. In analyzing dialog interaction 530 to show numeric weights, an error score, and the error threshold in operation, it shall be assumed that the severity of error for each category is of a normal severity.

When main prompt 1 is presented, the error score can be set to zero. The first response to the main prompt can be a syntactic error having an assigned numeric weight of two. The error score can be set from zero to two when the syntactic error prompt is presented to the caller. In response to this prompt, silence can be heard for too long, which triggers a timeout error. The timeout error can be a conceptual error having an assigned numeric weight of five. The error score can be adjusted from two to seven in response. The current system can be set so that the transferal to an operator only occurs when the error score exceed the maximum error threshold. Since at this point, both equal seven, the interaction between the system and caller can continue. The very next user response, however, can include a second conceptual error. The error score can be raised five more points so that is as a value of twelve, which exceeds the maximum error threshold. Consequently, a transfer message can be presented and the user can automatically be transferred to a human agent.

Figure 6:
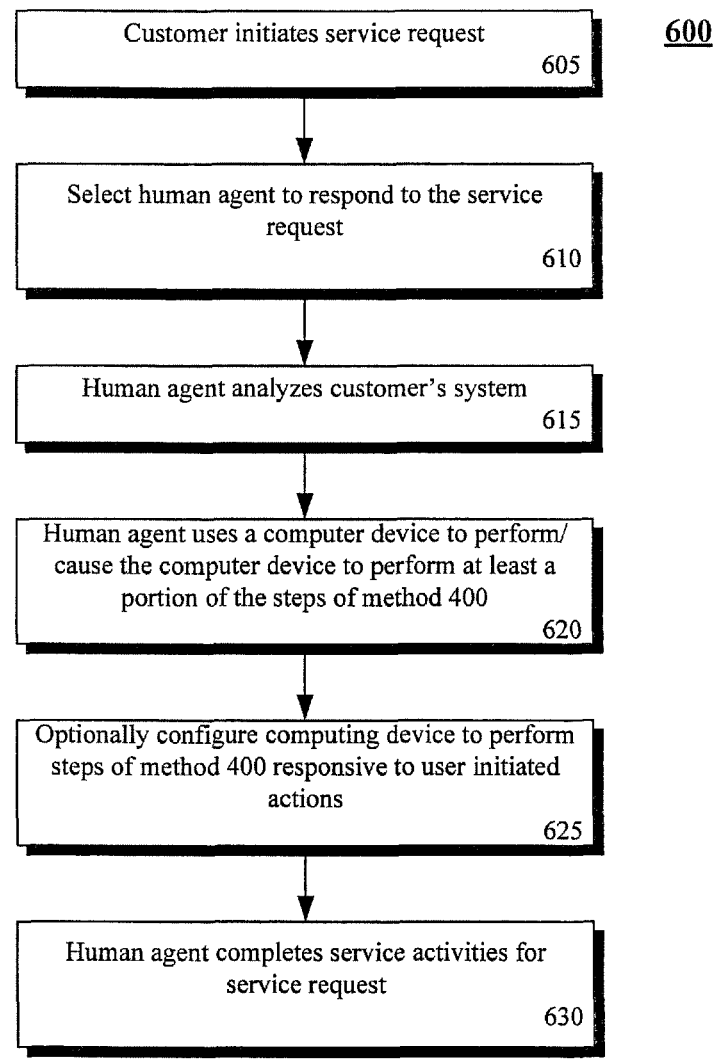
FIG. 6 is a flow chart of a method for a service agent to configure a speech response system in accordance with an embodiment of the illustrative arrangements disclosed herein.

FIG. 6 is a flow chart of a method 600 where a service agent configures a speech response system in response to a service request in accordance with an embodiment of the illustrative arrangements disclosed herein. For example, the service agent can configure system 100, 200, and/or 300 so that the system is capable of performing method 400.

In step 610, a human agent can be selected to respond to the service request. In step 615, the human agent can analyze a customer's computer that includes a speech response system. In step 620, the human agent can use one or more computing devices to perform or to cause the computer device to perform the steps of method 400. Appreciably, the one or more computing devices used by the human agent can include the customer's computer, a mobile computing device used by the human agent, a networked computing device, and combinations thereof.

For example, the human agent can establish default behavior for the speech response system, which can include establishing an error threshold, error categories, error severities, error weights, and the like. The human agent can also configure dialogue prompts, can troubleshoot and resolve system shortcomings, can train a user or administrator in the use or administration of the system, and can perform other such services.

In optional step 625, the human agent can configure the customer's computer in a manner that the customer can perform the steps of method 400 in the future. Once the customer's machine has been configured by the human agent, the newly configured machine can perform the steps of method 400 responsive to customer initiated actions. In step 630, the human agent can complete the service activities having resolved the problem for which the service request was submitted.

It should be noted that while the human agent may physically travel to a location local to the customer's computer when responding to the service request, physical travel may be unnecessary. For example, the human agent can use a remote agent to remotely manipulate the customer's computer system in the manner indicated in method 400.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer-implemented method used in conjunction with an automated speech response system, the method comprising:
    during an interactive dialog session between a user and an automated speech response system, determining a plurality of user responses to dialog prompts;
    detecting non-valid user responses from the plurality of user responses;
    assigning error weights to the non-valid user responses, wherein different non-valid user responses are assigned different error weights;
    for each one of the non-valid user responses, adjusting an error score for the interactive dialog session based upon the error weight assigned to the one of the non-valid user responses; and
    when a value of said error score exceeds a previously established error threshold, automatically transferring said user from the automated speech response system to a human agent.

2. The method of claim 1, further comprising:
    when the value of the error score does not exceed the previously established error threshold, continuing the interactive dialog session between the user and the automated speech response system.

3. The method of claim 1, further comprising:
    determining a severity of each of said non-valid user responses, wherein the assigned error weights are based at least in part upon said determined severity.

4. The method of claim 1, the assigning further comprising:
    for each non-valid user response, categorizing said non-valid user response into one of a plurality of categories, wherein the error weight associated with each non-valid user response is based at least in part upon a category of the plurality of categories assigned to the non-valid user response.

5. The method of claim 4, wherein the plurality of categories comprises a misrecognition category and a time out category.

6. The method of claim 4, wherein said plurality of categories comprises at least one category selected from the group consisting of an acoustic error category, a lexical error category, a syntactic error category, and a conceptual error category.

7. The method of claim 1, further comprising:
    for each one of the non-valid user responses for which the value of the error score does not exceed the previously established error threshold, subsequent to the adjusting, presenting an error prompt associated with the one of the non-valid user responses, wherein different non-valid user responses are associated with different error prompts.

8. The method of claim 1, wherein said dialog prompts are audible prompts including automatically generated speech, and wherein said user responses to the dialog prompts comprise speech utterances that are speech-to-text processed by the automated speech response system.

9. The method of claim 1, wherein the automated speech response system is an interface for a plurality of applications configured to be utilized during the interactive dialog session, wherein a value of the error score is maintained as the automated speech response system utilizes different ones of the plurality of applications.

10. The method of claim 1, further comprising:
    during the interactive dialog session, detecting a score adjustment event; and
    responsive to detecting the score adjustment event, decreasing the error score.

11. The method of claim 1, wherein the method is performed by a service agent or a computing device manipulated by the service agent, the method being performed in response to a service request.

12. The method of claim 1, wherein the method is performed by a machine in accordance with a plurality of machine-readable instructions that are executed by the machine, and wherein a service agent responding to a service request specifically configures said machine to perform the method.

13. A computer-implemented method for automatically transferring a user from a speech response system to a human agent, the method comprising:
    during a dialog session, presenting a prompt to a user;
    receiving and processing a response from the user to the prompt; and
    when the response is a non-valid user response,
        assigning an error weight to the non-valid user response, wherein different non-valid user responses are assigned different error weights;
        adding the error weight to an error score for the dialog session;
        comparing the error score to an error threshold; and
        automatically transferring the user to a human agent when the error score exceeds the error threshold.

14. The method of claim 13, further comprising:
    when the response is a valid user response, performing an appropriate programmatic action for the response; and
    repeating the presenting and receiving until a method-terminating event occurs, wherein the method-terminating event comprises detecting a user-initiated session termination event or detecting a system-initiated transfer to the human agent.

15. The method of claim 13, further comprising:
    when the response is a non-valid user response, categorizing the response into one of several categories of error responses, wherein the assigning step assigns the error weight to the non-valid user response based at least in part upon the category of the non-valid user response.

16. The method of claim 13, further comprising:
    when the response is a non-valid user response, determining an error severity level of the non-valid user response, wherein the assigning step assigns the error weight to the non-valid user response based at least in part upon the determined error severity level of the non-valid user response.

17. The method of claim 13, wherein the method is performed by a service agent or a computing device manipulated by the service agent, the method being performed in response to a service request.

18. A speech response system comprising at least one processor programmed to:
    detect user error responses during an interactive session;
    for each detected user error response, add to an error score for the interactive session an error weight associated with the user error response, wherein different error weights are assigned to different user error responses; and automatically transfer a user to a human agent when the error score for the interactive session exceeds an error threshold.

* * * * *